United States Patent [19]

Huang

[11] Patent Number: 5,896,185
[45] Date of Patent: Apr. 20, 1999

[54] FOLDABLE COMPACT GLASSES

[76] Inventor: David Huang, 2F, 53 Fu-Liu St., Keelung, Taiwan

[21] Appl. No.: 08/880,267

[22] Filed: Jun. 23, 1997

[51] Int. Cl.$^6$ .................................................. G02C 11/18
[52] U.S. Cl. ............................. 351/63; 351/41; 351/118; 2/454
[58] Field of Search ........................ 351/63, 41, 124, 351/126, 127, 111, 118, 119, 158; 2/454

[56] References Cited

U.S. PATENT DOCUMENTS

| | | | |
|---|---|---|---|
| 4,367,929 | 1/1983 | Fortini | 351/119 |
| 5,448,317 | 9/1995 | Huang | 351/63 |

FOREIGN PATENT DOCUMENTS

| | | |
|---|---|---|
| 73666 | 1/1986 | Taiwan . |
| 282840 | 8/1996 | Taiwan . |

*Primary Examiner*—Hung X. Dang
*Attorney, Agent, or Firm*—Ladas & Parry

[57] ABSTRACT

A pair of foldable compact glasses comprises two frames for retraining two lenses therein and each provided with a hinge device at the outer sides thereof, two temples respectively pivoting to the hinge devices, and a bridge device connecting the two frames. The bridge device can be folded about the normal axes of the frames such that the glasses can be subsequently received within a rigid container after folding.

10 Claims, 6 Drawing Sheets

FOLDABLE COMPACT GLASSES

FIELD OF INVENTION

This invention relates to a pair of foldable compact glasses, particularly to that can be folded about the normal axes of the frames to attain a slim thickness and thus be conveniently received within a rigid container.

BACKGROUND OF INVENTION

There exist various foldable compact glasses that can be received within such containers as glasses bags, for easy carriage as that disclosed in ROC (Taiwan) Patent Publication No. 282840. However, the dimension of such foldable compact glasses still has a relatively large thickness, which bulges the pocket, in which the glasses are carried by users after folding, and thus causes inconvenience. There also exist other foldable compact glasses having a bridge provided with a hinged structure that can be folded about the normal axes of the frames. However, such a design is readily to be folded in wear without imparting any force due to its unstable structure and thus causes inconvenience to users.

Another disadvantage of the foldable compact glasses lies in that the small folded volume thereof is easily neglected by the users thereby causing damages thereto by careless squeezes.

The present invention is thus designed to provide a pair of foldable compact glasses in light of the forgoing disadvantages, which glasses are characterized by a bridge device connecting two frames, which bridge device can be pivotally folded about the normal axes of the frames or fixed to its expanded state, such that the glasses can be received within a rigid container after folding thereby preventing the glasses from and increasing protection thereof against accidental occurrences of squeezes and damages.

BRIEF DESCRIPTION OF INVENTION

One object of the present invention is to provide a pair of foldable compact glasses having a bridge device comprising at least one bridge block secured to the inner side of one of the frames, a link block or a pivotal block, and a pin such that the glasses can be pressed to rotate and pivotally fold about the normal axes of the frames or to be fixed at the expanded state of use, wherein the folded thickness is relatively slimmer than that of conventional compact glasses.

Another object of the present invention is to provide a compact and rigid container for such foldable compact glasses thereby preventing the glasses from and increasing the protection thereof against accidental occurrences of squeezes and damages.

The structure and features of the present invention can be readily realized by those skilled in the art with reference to the descriptions of the preferred embodiments accompanied with the drawings.

LIST OF SYMBOLS

| LIST OF SYMBOLS | |
|---|---|
| R | Radius |
| t | wall thickness of pivotal block |
| T | thickness of bridge block |
| 10 | glasses |
| 12 | frames |
| 14 | temple |
| 16 | hinge device |
| 40 | rigid container |
| 100 | bridge device |
| 102 | bridge block |
| 102' | bridge block |
| 104 | link block |
| 104' | pivotal block |
| 108 | pin |
| 110 | compression spring |
| 112 | ball |
| 121 | lens |
| 141 | retractable temple |
| 142 | stationary temple |
| 150 | bridge device |
| 1021' | disk body |
| 1022 | pivotal opening |
| 1022' | pivotal opening |
| 1024 | recess |
| 1024' | recess |
| 1042 | pivotal seat |
| 1042' | pivotal seat |
| 1044 | bottom stop block |
| 1044' | bottom stop block |
| 1046 | through hole |
| 1046' | blind hole |

DETAILED DESCRIPTION OF PREFERRED EMBODIMENT

For the ease of explaining the structural design of this invention, the horizontal plane to which the specification refers, relates to the plane on which the temples rest on after being expanded.

Figure 1:
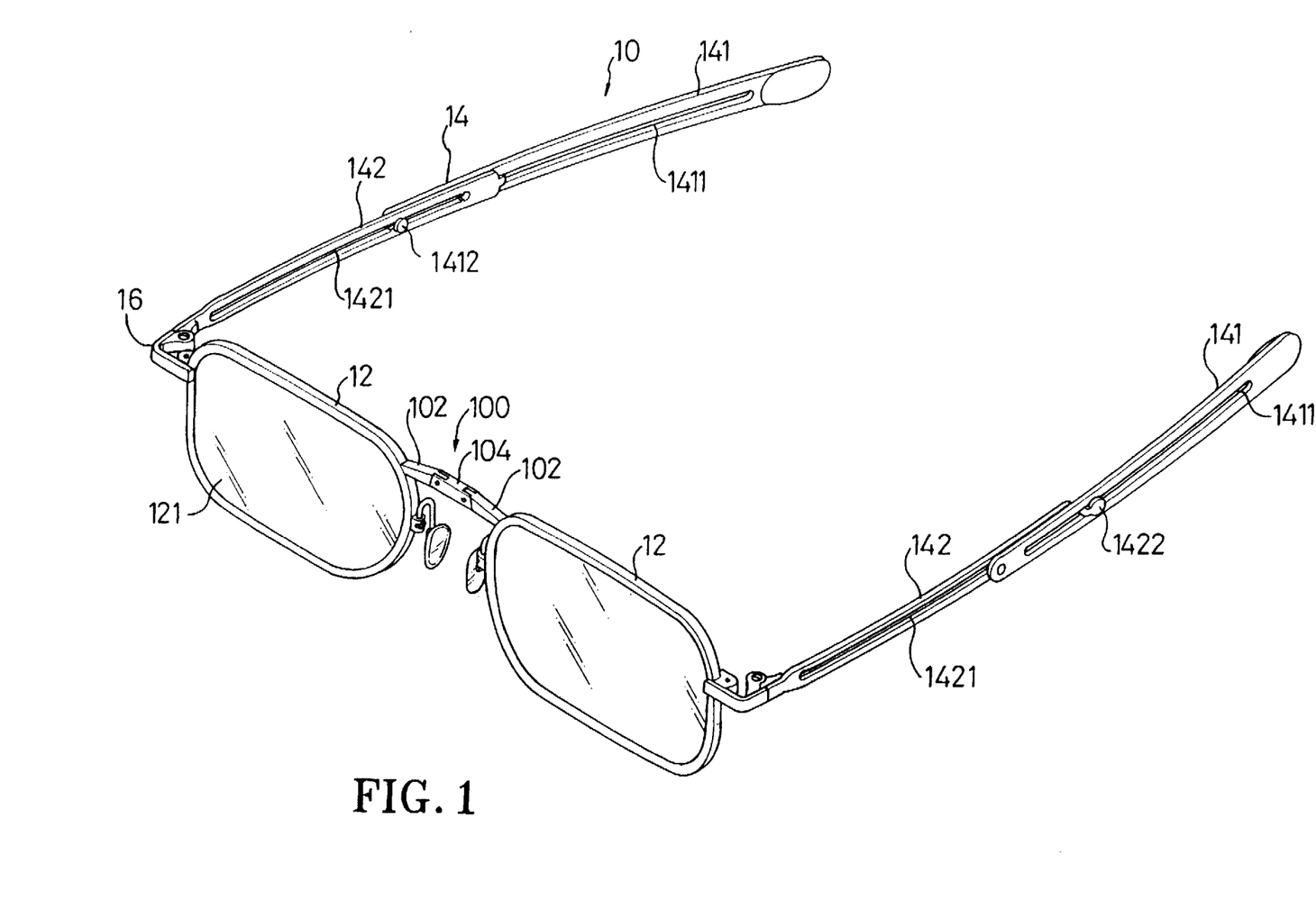
FIG. 1 perspective view showing a pair of conventional foldable glasses having a bridge device according the present invention under the expanded state of use.

FIG. 1 illustrates the first embodiment of a pair of foldable compact glasses 10 according to this invention under the expanded state of use. The glasses 10 comprise two frames 12 for retaining two lenses therein, two hinge devices 16 provided at the outer sides of the frames 12 for pivotally connecting two temples 14; and a bridge device 100 for connecting the frames 12.

The retractable temples 14 as illustrated in FIG. 1 enable the compact glasses 10 to be folded into a smaller dimension. The temples 14 illustrated in FIG. 1 each comprise a retractable temple member 141 and a stationary temple member 142. The temples members 141, 142 are each formed with a temple sliding slot 1411, 1421 between the opposite ends thereof. One end of the retractable temple member 141 is provided with a connecting device 1412 for clinching into the sliding slot 1421 of the stationary temple member 142. The free end of the stationary temple member 142 is provided with another connecting device 1422 for clinching into the sliding slot 1411 of the retractable temple member 142 such that the retractable temple member 142 can be frictionally and slidably positioned within the sliding slot 1421 of the stationary temple member 142. In this embodiment, the connecting devices 1412, 1422 are, respectively, a template catch button and a bolted screw.

Figure 2:
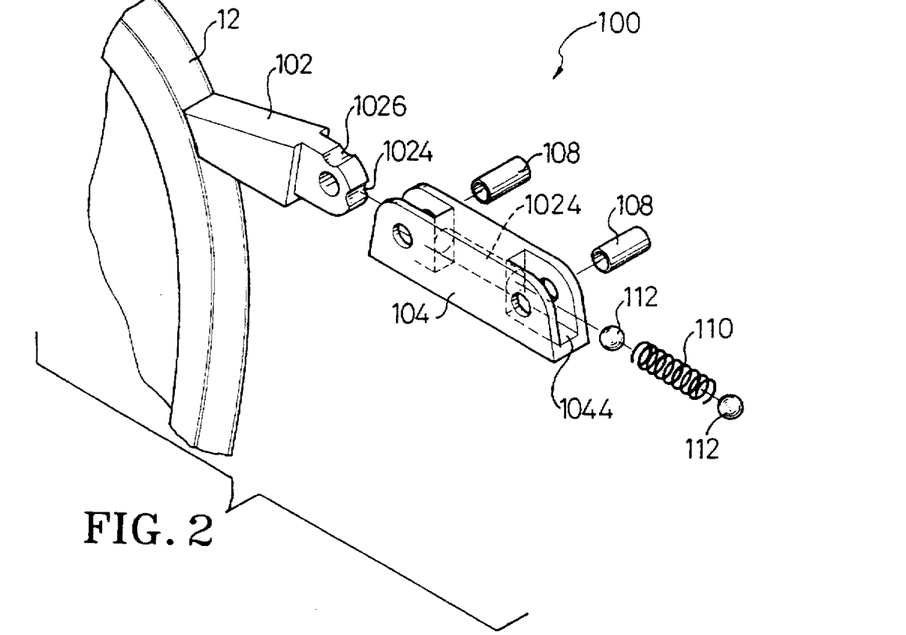
FIG. 2 is a partially enlarged and exploded perspective view illustrating the bridge device of the foldable compact glasses illustrated in FIG. 1.
Figure 3:
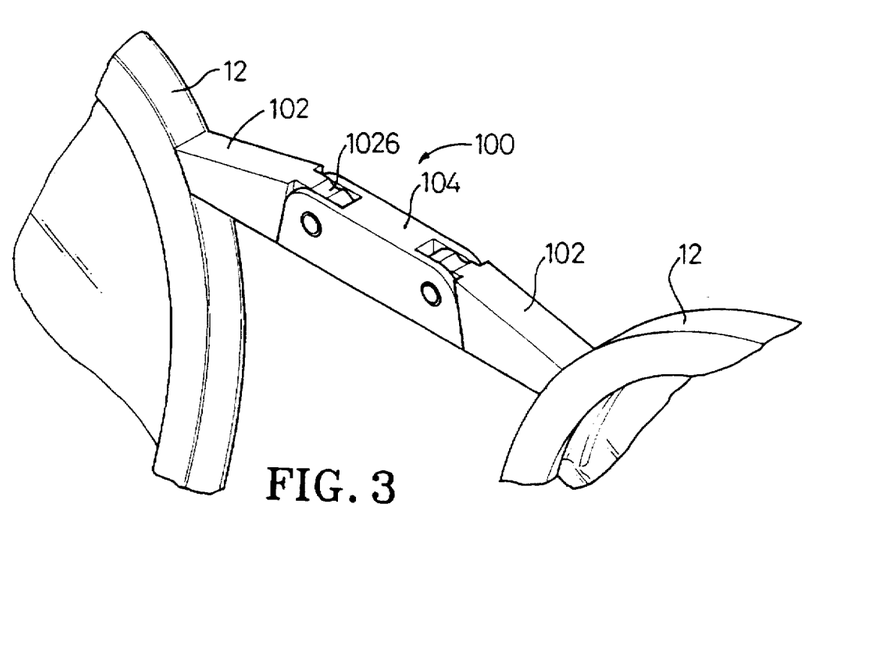
FIG. 3 is a partially enlarged and assembled perspective view illustrating the bridge device of the foldable compact glasses illustrated in FIG. 1.

A partially enlarged and exploded perspective view illustrating the bridge device of the foldable compact glasses of FIG. 1 is shown in FIG. 2, wherein the bridge device 100 includes two bridge blocks 102 (only one is illustrated in FIG. 2) that are integrally formed with the frames 12 and oppositely project from the upper inner ends of the frames 12, and a link block 104. The free end of the bridge block 102 is formed with a pivotal opening 1022 parallel to the normal axes of the frames 12 and the end surface and top surface of the bridge block 102 are respectively formed with recesses 1024, 1026. The link block 104 is disposed between the bridge blocks 102 along the horizontal axis, and the opposite ends of which link block 104 are each formed with a pivotal seat 1042 for pivotally connecting the link block 104 to the free end of the bridge block 102 by means of a pin 108 passing through the pivotal opening 1022 and the pivotal seat 1042. The pivotal seat 1042 can be formed with a bottom stop block 1044 for preventing the bridge device from rotating downwards. The link block 104 is formed with a horizontally though hole 1046 at the center thereof for receiving a compression spring 110 and two balls 112, wherein the balls 112 are disposed at the opposite ends of the spring 110. The length of the through hole 1046 is slightly smaller than the summation of the diameter of the balls 112 and the length of the compression spring 110 such that the ends of the balls 112 slightly protrude out of the through hole 1046 after assembly whereby the balls 112 are elastically secured within the recesses 1024, 1026 formed at the free ends of the bridge blocks 102. FIG. 3 illustrates the bridge device 100 after assembly. The cross-sectionally schematic view of FIG. 4 illustrates the inter-operation relation among components.

Figure 6:
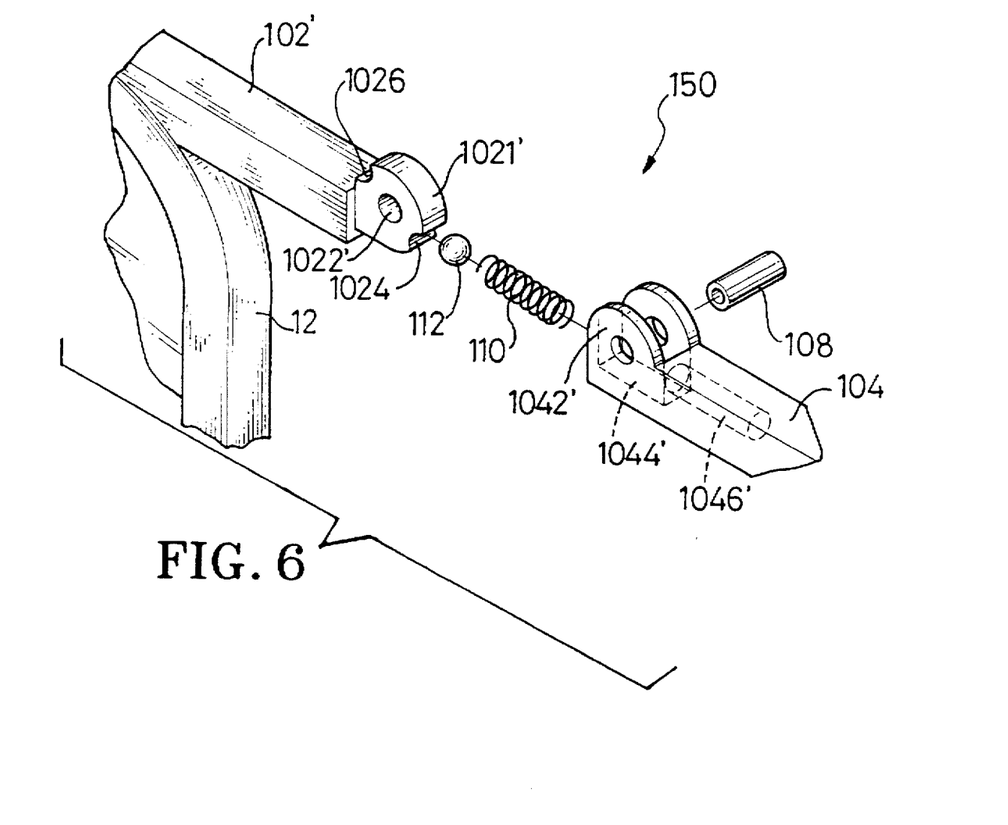
FIG. 6 is a partially enlarged and exploded perspective view illustrating another preferred embodiment according to the present invention.
Figure 8:
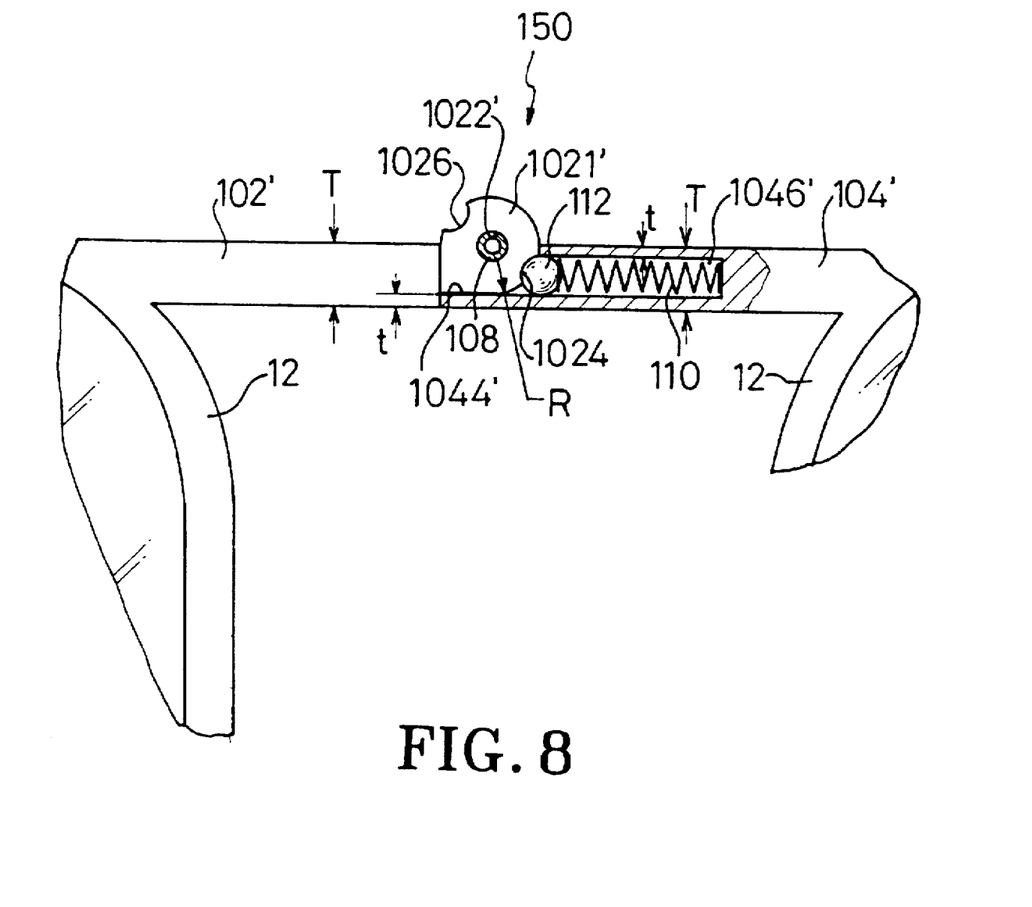
FIG. 8, a cross-sectionally schematic view of the bridge device of the foldable compact glasses of FIG. 6 in operation.

FIG. 6 is a partially enlarged and exploded perspective view illustrating a bridge device 150 of the second preferred embodiment according to the present invention. The differences between the bridge device 150 and the bridge device 100 illustrated in FIG. 2 reside in that, the bridge device 150 only includes a pivotal device, comprising a bridge block 102' and a pivotal block 104', which are integrally formed with the frames 12, 12' and oppositely project from the upper inner ends of the frames 12, 12', respectively. FIG. 8 illustrates the inter-relation among components, wherein the bridge block 102 has a thickness T and the free end thereof is formed with a substantially circular disk 1021' having a radius R, on the center the disc 1021' being formed with a pivotal opening 1022'. The central axis of the pivotal opening 1022' is parallel to the normal axes of the frames 12 and preferred to extend along the same plan of the top surface of the bridge block 102'. The disk 1021' radius R is smaller than the overall thickness T of the bridge block 102' and the difference therebetween (T-R) is preferred to equal to the wall thickness t of the bridge block 102'. At the free end (located on the disk 1021') of the bridge block 102' and a spot (also located on the disk 1021') being at an angle to the free end are respectively formed with recesses 1024', 1026'.

Figure 7:
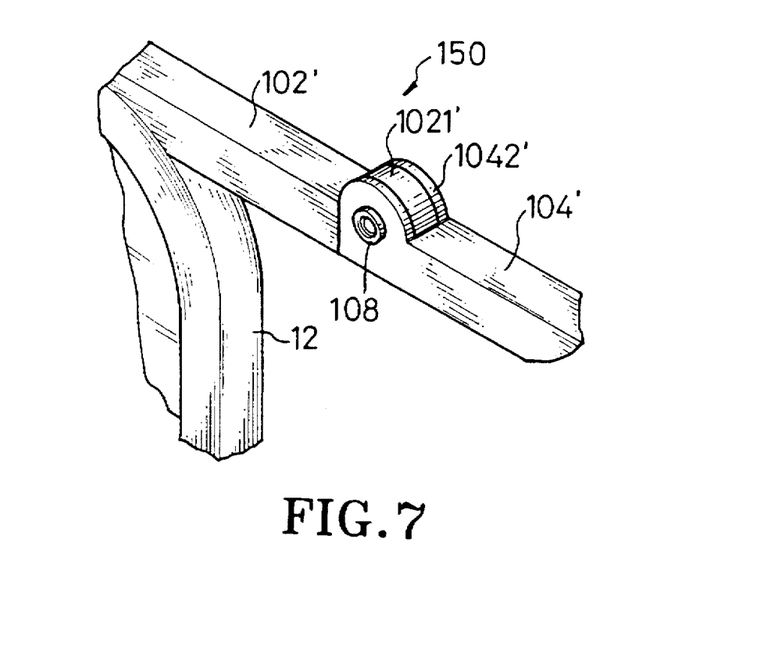
FIG. 7 is a partially enlarged and assembled perspective view illustrating the bridge device of the foldable compact glasses illustrated in FIG. 6.

The pivotal block 104' preferably has an overall thickness equal to T and a wall thickness equal to t. A substantially semi-circular pivotal seat 1042' projects from the top of the free end of the pivotal block 104' and preferably has a radius equal to R. The pivotal block 104' is pivotally connected to the bridge block 102' by means of a pin 108 passing through the pivotal opening 1022' and the pivotal seat 1042'. The pivotal seat 1042' can be formed with a bottom stop block 1044' for preventing the bridge device from rotating downwards. The pivotal block 104' is formed with a horizontally blind hole 1046' at the center thereof for receiving a compression spring 110 and a ball 112, wherein the ball 112 is disposed at the open end of the blind hole 1046'. The depth of the blind hole 1046' is slightly larger than the length of the compression spring 110 such that the end of the ball 112 slightly protrudes out of the blind hole 1046' after assembly, whereby the ball 112 is elastically secured within the recesses 1024', 1026' formed at the free end of the bridge block 102'. FIG. 7 illustrates the bridge device 100 after assembly.

Figure 4:
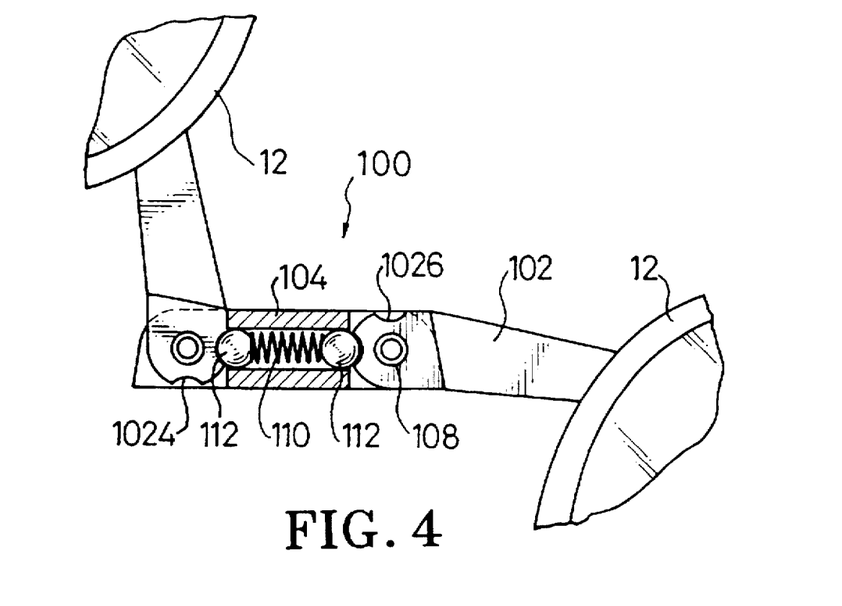
FIG. 4 is a cross-sectionally schematic view of the bridge device of the foldable compact glasses of FIG. 1 in operation.
Figure 9:
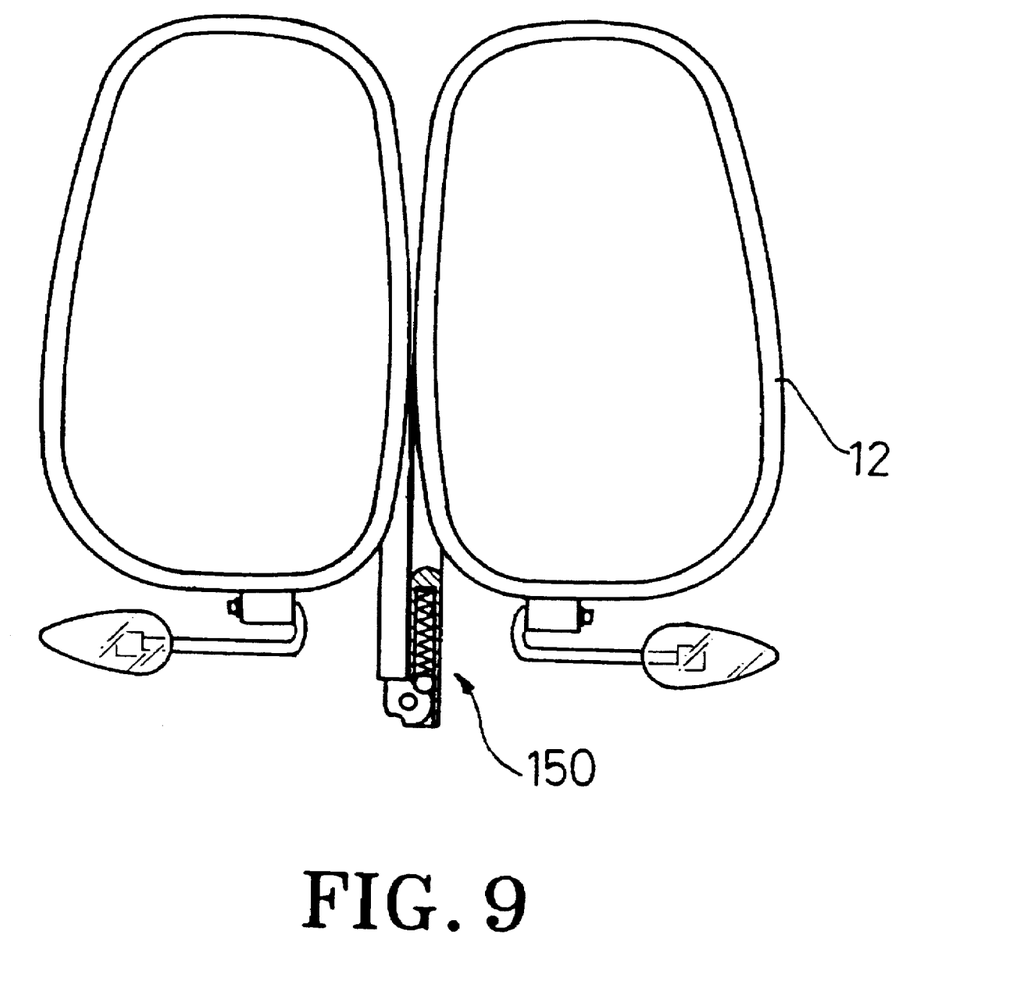
FIG. 9 a, schematic view illustrating the foldable compact glasses of FIG. 6 after folding.

In use, the recess 1024, 1024' formed at the free end of the bridge block 102, 102' is elastically secured to the ball 112 by means of the spring 110 as illustrated in FIGS. 4 and 9 such that the frames 12 are fixed to the expanded state of use.

To fold the glasses, force is slightly imparted to compress the frames 12 (12') and subjects the ball(s) 112 to compress the spring 110 such that the recess 1026, 1026' formed on the bridge block 102, 102' is elastically secured to the ball(s) 112 after folding the bridge block 102, 102' about the normal axes of the frames via the pin 108.

Figure 5:
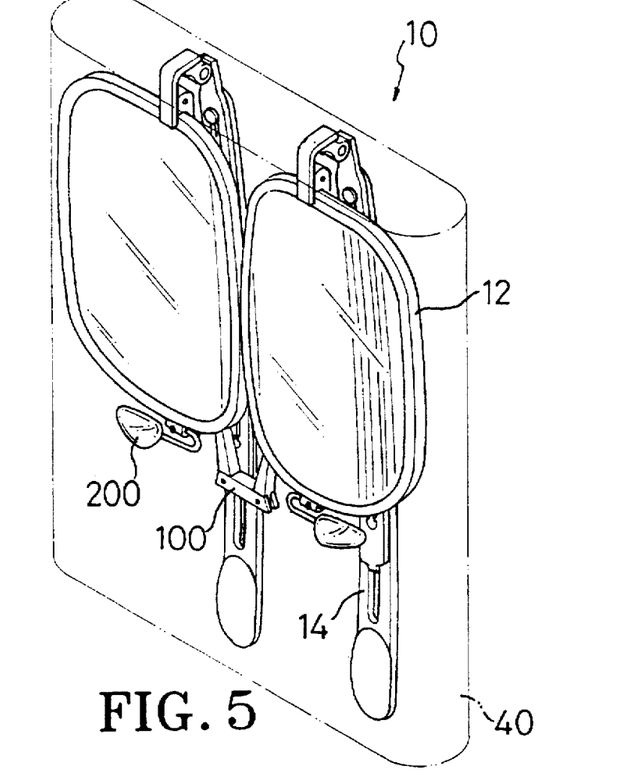
FIG. 5 a perspective view of the foldable compact glasses of FIG. 1 under the state of being completely folded and received in a rigid container.

The glasses 100 can then be received within a rigid container 40 as illustrated in FIGS. 5 and 9. The dimension of the completely folded glasses is such to be received within a rigid container 40 (FIG. 5) having a relatively slim configuration for being conveniently carried by users.

The temples 14 illustrated in FIG. 1 can also be replaced by conventional ones. Other conventional connecting measures can otherwise be implemented to slidably interconnect the stationary temple member 142 and retractable temple member 141. Such equivalent variations can be readily conducted by persons in this art.

Aforementioned explanation is directed to the description of the preferred embodiments according to the present invention. Various changes and implementations can be made by those skilled in the art without departing from the technical concept of the present invention. Since the present invention is not limited to the specific details described in connection with the preferred embodiments except those that may be within the scope of the appended claims, changes to certain features of the preferred embodiments without altering the overall basic function of the invention are contemplated.

What is claimed is:

1. A pair of foldable compact glasses, comprising:
two frames for retaining two lenses therein, each provided with a hinge device at the outer side thereof;
two temples being respectively connected to said hinge devices provided at the outer sides of said frames; and
a bridge device including two bridge blocks and a link block, wherein said bridge blocks are respectively provided at the inner sides of said frames and each have a free end, said free end being formed with a pivotal opening parallel to the normal axes of said frames, and the end surface and top surface of said free end being each formed with a recess; a link block is disposed between said bridge blocks, the opposite ends thereof being each formed with a pivotal seat corresponding to said pivotal opening formed on said free end of each said bridge block whereby said free end of said bridge block is pivotally connected to said pivotal seat by means of a pin; the center of said link block is formed with a horizontally through hole, in which being received with two balls and a spring, wherein said spring is such disposed to urge said balls subjecting said balls to press against said free end of said bridge block and to be elastically secured within said recesses formed on said free ends.

2. The foldable compact glasses according to claim 1, wherein said pivotal seat is provided with a bottom stop preventing said bridge device from rotating downwards.

3. The foldable compact glasses according to claim 1, wherein said temples each comprise:

a stationary temple member in an elongated and thin shape, one end of which being pivotally connected to said hinge device provided at the outer side of said frame and a sliding slot being formed between opposite ends thereof; and a retractable temple member also in an elongated and thin shape, one end of which is connected to and slidably positioned within said sliding slot of said stationary temple by means of a connecting device, said retractable temple member being formed with a sliding slot along the longitudinal axis thereof for connecting and slidably positioning said stationary temple member therein by means of another connecting device.

4. The foldable compact glasses according to claim 1, wherein said foldable compact glasses are in a flatly slim shape after folding so as to be received within a rigid container.

5. A pair of foldable compact glasses, comprising:

two frames for retaining two lenses therein, each provided with a hinge device at the outer side thereof;

two temples being respectively connected to said hinge devices provided at the outer sides of said frames; and a bridge device including a bridge block and a pivotal block that are respectively provided at the inner sides of said frames, wherein said bridge block has a free end, on which is formed with a substantially circular disk, the center of said disk being formed with a pivotal opening parallel to the normal axes of said frames, and at the end of said free end and a spot that is at an angle to said free end being each formed with a recess; said pivotal block has a free end, on which is formed with a pivotal seat corresponding to said pivotal opening formed on said free end of said bridge block whereby said free end of said bridge block is pivotally connected to said pivotal seat by means of a pin; the center of said pivotal block is formed with a horizontal blind hole, in which being received with a ball and a spring, wherein said spring is such disposed to urge said ball subjecting said ball to press against said free end of said bridge block and to be elastically secured within said recesses formed on said free end of said bridge block.

6. The foldable compact glasses according to claim 5, wherein said pivotal seat is provided with a bottom stop preventing said bridge device from rotating downwards.

7. The foldable compact glasses according to claim 5, wherein said temples each comprise:

a stationary temple member in an elongated and thin shape, one end of which being pivotally connected to said hinge device provided at the outer side of said frame and a sliding slot being formed between opposite ends thereof; and a retractable temple member also in an elongated and thin shape, one end of which is connected to and slidably positioned within said sliding slot of said stationary temple by means of a connecting device, said retractable temple member being formed with a sliding slot along the longitudinal axis thereof for connecting and slidably positioning said stationary temple member therein by means of another connecting device.

8. The foldable compact glasses according to claim 5, wherein said foldable compact glasses are in a flatly slim shape after folding so as to be received within a rigid container.

9. A pair of foldable compact glasses, comprising:

two frames for retaining two lenses therein, each provided with a hinge device at the outer side thereof;

two temples being respectively connected to said hinge devices provided at the outer sides of said frames, each of said temples comprising:

a stationary temple member in an elongated and thin shape, one end of which being pivotally connected to said hinge device provided at the outer side of said frame and a sliding slot being formed between opposite ends thereof; and a retractable temple member also in an elongated and thin shape, one end of which is connected to and slidably positioned within said sliding slot of said stationary temple by means of a connecting device, said retractable temple member being formed with a sliding slot along the longitudinal axis thereof for connecting and slidably positioning said stationary temple member therein by means of another connecting device; and a bridge device including two bridge blocks and a link block, wherein said bridge blocks are respectively provided at the inner sides of said frame and each have a free end, said free end being formed with a pivotal opening parallel to the normal axes of said frames, and the end surface and top surface of said free end being each formed with a recess; a link block is disposed between said bridge blocks, the opposite ends thereof being each formed with a pivotal seat corresponding to said pivotal opening formed on said free end of each said bridge block whereby said free end of said bridge block is pivotally connected to said pivotal seat by means of a pin; said pivotal seat is provided with a bottom stop preventing said bridge device from rotating downwards; the center of said link block is formed with a horizontally through hole, in which being received with two balls and a spring, wherein said spring is such disposed to urge said balls subjecting said balls to press against said free ends of said bridge blocks and to be elastically secured within said recesses formed on said free end;

whereby said foldable compact glasses are in a flatly slim shape after folding so as to be received within a rigid container.

10. A pair of foldable compact glasses, comprising:

two frames for retaining two lenses therein, each provided with a hinge device at the outer side thereof;

two temples being respectively connected to said hinge devices provided at the outer sides of said frames, each of said temples comprising:

a stationary temple member in an elongated and thin shape, one end of which being pivotally connected to said hinge device provided at the outer side of said frame and a sliding slot being formed between opposite ends thereof; and a retractable temple member also in an elongated and thin shape, one end of which is connected to and slidably positioned within said sliding slot of said stationary temple by means of a connecting device, said retractable temple member being formed with a sliding slot along the longitudinal axis thereof for connecting and slidably positioning said stationary temple member therein by means of another connecting device; and a bridge device including a bridge block and a pivotal block that are respectively provided at the inner sides of said frames, wherein said bridge block has a free end, on which is formed with a substantially circular disk, the center of said disk being formed with a pivotal opening parallel to the normal axes of said frames, and at the end of said free end and a spot that is at an angle to said free end being each formed with a recess; said pivotal block has a free end, on which is formed with a pivotal seat corresponding to said pivotal opening formed on said free end of said bridge block whereby said free end of said bridge block is pivotally connected to said pivotal seat by means of a pin; said pivotal seat is provided with a bottom stop preventing said bridge device from rotating downwards; the center of said pivotal block is formed with a horizontal hole, in which being received with a ball and a spring, wherein said spring is such disposed to urge said ball subjecting said ball to press against said free ends of said bridge blocks and to be elastically secured within said recesses formed on said free end of said bridge block;

whereby said foldable compact glasses are in a flatly slim shape after folding so as to be received within a rigid container.

\* \* \* \* \*